(12) United States Patent
Ambrose et al.

(10) Patent No.: US 6,760,706 B1
(45) Date of Patent: Jul. 6, 2004

(54) POINT OF SALES SYSTEMS FOR VEHICLES

(75) Inventors: Alan S. Ambrose, Midland, MI (US); Glwynn R. Baker, Frankenmuth, MI (US); James D. Ferguson, Mt. Pleasant, MI (US); William S. McDonald, Saginaw, MI (US)

(73) Assignee: Advanced Information Systems, Inc., Midland, MI (US)

( * ) Notice: Subject to any disclaimer, the term of this patent is extended or adjusted under 35 U.S.C. 154(b) by 0 days.

(21) Appl. No.: 09/289,311

(22) Filed: Apr. 9, 1999

(51) Int. Cl.[7] .............................................. G06F 17/60
(52) U.S. Cl. ........................................ 705/16; 705/25
(58) Field of Search ................. 705/16, 25; 340/573.1; 709/217–219; 116/28 R; 280/727, 762, 769; 224/929

(56) References Cited

U.S. PATENT DOCUMENTS

| | | | |
|---|---|---|---|
| 3,487,360 A | * 12/1969 | Thompson | 340/472 |
| 4,635,110 A | * 1/1987 | Weinblatt | 358/93 |
| 4,670,798 A | * 6/1987 | Campbell et al. | 360/12 |
| 4,984,098 A | 1/1991 | Buntsis | |
| 5,053,746 A | * 10/1991 | Taneo | 340/473 |
| 5,053,956 A | * 10/1991 | Donald et al. | 364/401 |
| 5,132,666 A | * 7/1992 | Fahs | 340/468 |
| 5,218,348 A | * 6/1993 | Trotta | 340/711 |
| 5,264,822 A | 11/1993 | Vogelman et al. | |
| 5,426,414 A | * 6/1995 | Flatin et al. | 340/472 |
| 5,504,675 A | 4/1996 | Cragun et al. | |
| 5,630,071 A | 5/1997 | Sakai et al. | |
| 5,642,484 A | 6/1997 | Harrison et al. | |
| 5,657,004 A | 8/1997 | Whittaker et al. | |
| 5,671,331 A | 9/1997 | Croley | |
| 5,802,100 A | 9/1998 | Pine et al. | 395/279 |
| 5,953,047 A | * 9/1999 | Nemirofsky | 348/13 |
| 6,177,880 B1 | * 1/2001 | Begum | 340/825.35 |
| 6,178,446 B1 | * 1/2001 | Gerszberg et al. | 709/217 |
| 6,195,000 B1 | * 2/2001 | Smith et al. | 340/471 |

FOREIGN PATENT DOCUMENTS

JP             403001690       * 1/1991     ............ H04N/7/14

OTHER PUBLICATIONS

Davids, Meryl, "Used cars, new strategies", Jul./Aug. 1997, Journal of Business Strategy, v18n4 PP:22–28.*

* cited by examiner

Primary Examiner—Michael Cuff
(74) Attorney, Agent, or Firm—Reising, Ethington, Barnes, Kisselle, P.C.

(57) ABSTRACT

A novel point of sales systems for vehicles. The systems are comprised of a housing attachable to the exterior of the vehicle which contains components of the system which are interactive with regard to the customer. Another embodiment of the invention is a two housing system in which one housing is attachable on the exterior of the vehicle and the second housing is placed inside the vehicle. Examples of an interactive system are an interactive game, coupon request and receipt, participation in a survey, and the like.

32 Claims, 5 Drawing Sheets

POINT OF SALES SYSTEMS FOR VEHICLES

The invention disclosed and claimed herein deals with novel, portable, point of sales systems for vehicles. The systems are comprised of a housing attachable to the exterior of the vehicle which contains components of the system which are interactive with regard to the customer. Another embodiment of the invention is a two housing system in which one housing is attachable on the exterior of the vehicle and the second housing is placed inside the vehicle. Examples of an interactive system are an interactive game, coupon receipt, participation in a survey, communicating with a salesperson, or the like.

BACKGROUND OF THE INVENTION

This invention deals with novel, portable point of sales systems for vehicles. The most fundamental use for systems of this invention are as a direct customer contact opportunity. The invention's primary but not exclusive function is to better inform customers who browse or shop for vehicles. This is most important when a dealership for the vehicle is closed. The systems, in addition to providing valuable information about the vehicle to which they are attached, provide for additional interactivity, provide audio and video playback, recording, data storage or transmission, and games, or the like, in which prizes may or may not be awarded.

Thus, the customer would activate the system for the purpose of gaining more in-depth information on the vehicle, or other salient information with regard to special pricing, incentives, or service promotions. Further, the system allows the customer to input audio, video, numeric or symbolic information.

Systems for point of sales activity can be found in U.S. Pat. No. 4,984,098, which issued Jan. 8, 1991 to Buntsis in which a point of purchase advertising device is disclosed which generates a pre-recorded audio message automatically whenever a person is nearby, and then the device resets itself automatically to prepare for the presence of another person. This system does not appear to be interactive, but only activated by the customer.

Another system is disclosed in U.S. Pat. No. 5,264,822, which issued Nov. 23, 1993, to Vogelman et. al. in which there is disclosed a system for delivering audio advertising messages to people pushing shopping carts moving through a plurality of spatially defined transmission zones arranged in the aisle of a store. This is accomplished by having shelf transmitters in each aisle of the store and such transmitters respond to the presence of a shopping cart residing in its own spatially defined transmission zone. Upon detection of the person with the shopping cart, an audio message is delivered within that aisle. This system does not seem to be interactive either.

One other disclosure can be found in U.S. Pat. No. 5,504,675, which issued Apr. 2, 1996, to Cragun et al. There is disclosed therein a sales promotion program similar to the Buntsis approach, in which information is given to a person that is sensed in the immediate area of the system, by the system. There does not seem to be any interactive portion to the system.

An additional U.S. Patent that deals with a point of sales system is U.S. Pat. No. 5,630,071, which issued May 13, 1997 to Sakai et al in which there is disclosed a purchased commodity accommodating and transporting apparatus having a self scanning function such that the purchaser will not exceed a certain amount of predetermined purchase monies. There does not appear to be any interactive mode to this system.

A pump top advertisement is disclosed in U.S. Pat. No. 5,642,484, which issued on Jun. 24, 1997, to Harrison, et al, in which a point of sale information distribution and presentation system which is centrally controlled, is used to distribute and/or display audio and/or visual information selectively from the top of a gasoline pump. This, and the Sakai, et al reference do not seem to be interactive.

A display device is disclosed in U.S. Pat. No. 5,657,004, which issued on Aug. 12, 1997 to Whittaker, et al in which an electronic display device provides both an audio message and a visual message. This device does not appear to be interactive.

Finally, there is disclosed in U.S. Pat. No. 5,671,331, which issued on Sep. 23, 1997 to Croley, a vending apparatus for printed publications which includes a programmable announcement capability to be triggered when the door of the apparatus is opened. This device does not seem to employ an interactive system.

The systems and devices of the prior art as discussed supra do not seem to have the benefits of the systems described herein.

THE INVENTION

The invention disclosed and claimed herein deals with novel, portable, point of sales systems for vehicles. In the broadest sense, this invention deals with a point of sale system comprising a first housing containing an activatable system housed in it. There is a means for affixing the first housing to the outside of a vehicle.

There is a second housing containing systems control equipment housed in it and a means of connecting the systems control to the activatable system. There is also a means of powering the systems control and the activatable system, and, a means of triggering the operation of the point of sale system in addition to a data input and/or output system.

In addition, there is provided a method of providing a point of sale system for a vehicle wherein the method comprises (I) utilizing a first housing containing an activatable system housed in it and wherein this housing is mounted on the outside of a vehicle. There is utilized a second housing containing a control system for the activatable system. The second housing is contained within the vehicle.

There is provided a second component of the method, (II), which provides for at least one connecting means between the components of the first housing and the components of the second housing, which, for example, can be electrically hard wired such as through wire or cable, or wireless, such as through electrical connections, such as radio, or infrared links, and the like, any of which have the requirement of stimulating and activating the components of either housing using the means from the other housing.

There is also provided a third component, (III), which is providing at least one means of powering the point of sale system. And, in addition, there is provided a fourth component, (IV), which is providing a starting means to start operation of the components of the first and second housing. There is a fifth component, (V), which is powering the systems, and finally, there is a sixth component, (VI), which is a data input and/or output system.

"Vehicles" for purposes of this invention includes any vehicle that can be displayed for sale and includes, but is not limited to, automobiles, trucks, snow machines, all terrain vehicles, water vehicles such as jet skis and boats, and the like.

DETAILED DESCRIPTION OF THE INVENTION

Figure 1:
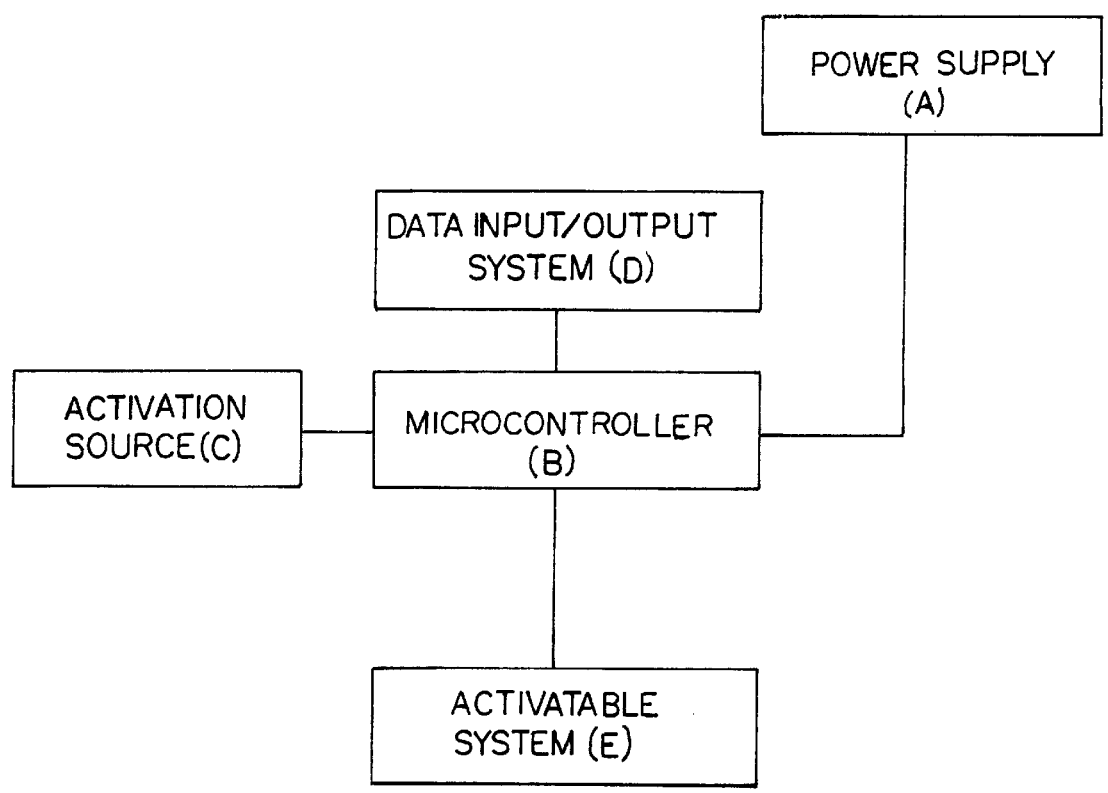
FIG. 1 is a block diagram of a basic point of sale system of this invention.

Turning now to FIG. 1, which is a block diagram of a basic point of sale system of this invention, there is shown five boxes illustrating various components of this invention. Box A is a power supply for the system and can be, for example, from the power supply of a vehicle, such as the DC battery, or it can be a means of solar to electrical energy conversion, or it can be, for example, AC or DC electricity from a nearby source. The power supply A is connected directly to the control system, box B, for the point of sale system. The control system can be for example, a microcontroller which is commercially available, and can consist of various elements such as EEPROM/RAM, a clock, telephone input and/or output ports, Serial multi-pin input and/or output cable, and Parallel multi-pin input and/or output ports. Box C is an activation source such as an alphanumeric key pad, a symbolic key pad, a video touch screen, or a simple touch button, which can activate the system and with which, the customer can become interactive with the point of sale system. There is further shown Box D, which is a data input and/or output system, and which for purposes of this invention can be any means by which data is input to the system, or output out of the system.

One simple means of data input and/or output is, for example, a wireless radio or infrared data link to receive and transmit certain data.

Figure 2:
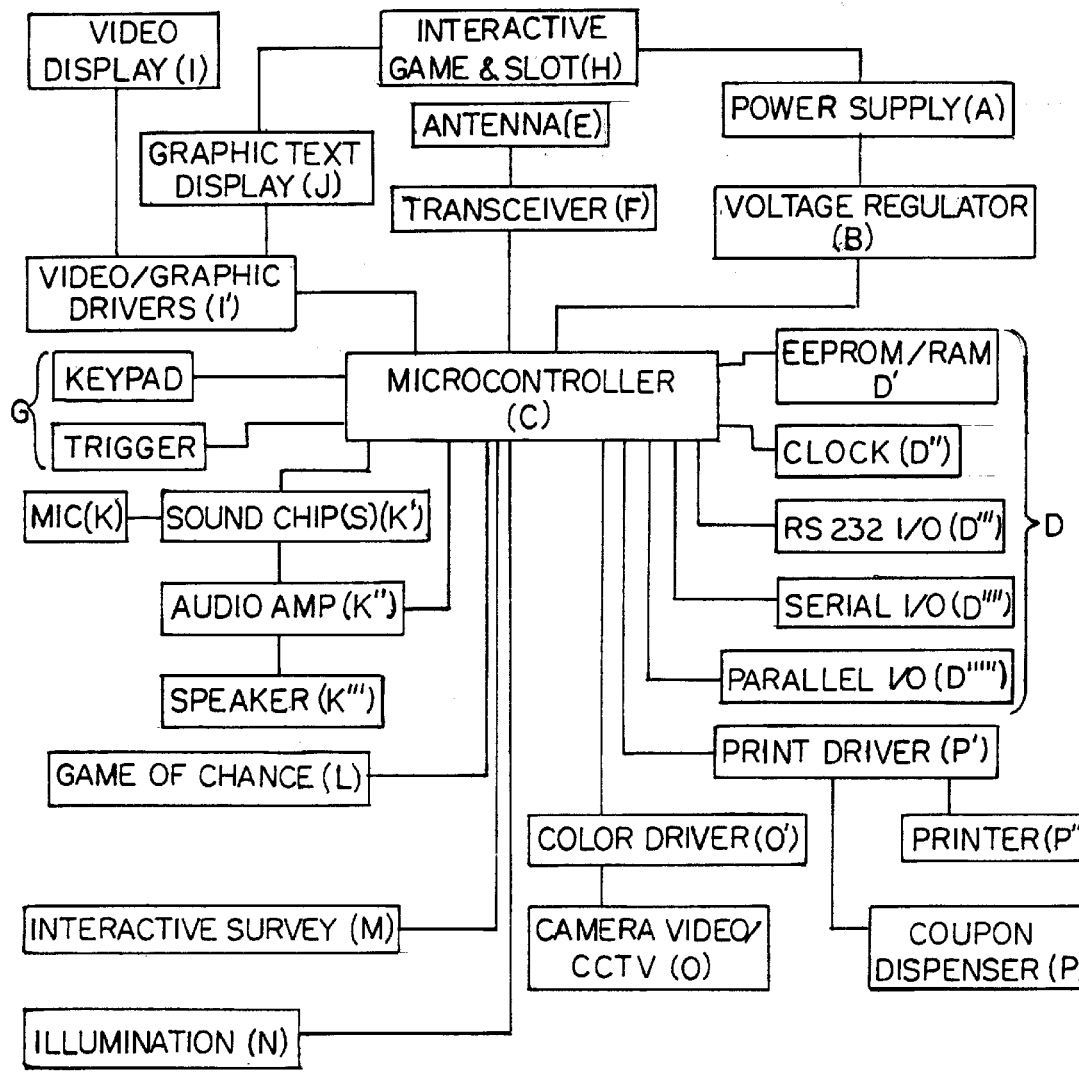
FIG. 2 is a block diagram of a more complex point of sale system of this invention.

Reference should be made to FIG. 2 which illustrates many more input and/or output means, such as for example, those described infra.

Finally, the fifth Box, Box E, is the activatable system of this invention. Such an activatable system is for example, an electronic display screen, which displays information or an interactive game, a microphone, a coupon printer, such as a thermal coupon printer, coupon vending equipment, audio recording and playback systems, video display systems, video recording and playback systems, survey systems, interactive games, coupon dispenser, cameras, an illumination system, an information area, a speaker, and a microcontroller. Interactive games include for example, quizzes, board games, games of chance, and other such games that exist or can be created. Examples of board games are, for example, checkers, dominoes, and chess. Other useful games include roulette, dice, poker, and the like. These games can be powered electrically or they can be powered mechanically.

The exact electronic configurations of the electronic games are not complex, and can be found in many marketed entertainment or recreational products. They can also be readily assembled from component parts that are commercially available. There is also provided such electronics in the form of kits which enable one to build a roulette game or the like. Further, it is contemplated to include simulated sports games, for example, baseball, football, basketball, and those types of games found in hand held electronic systems currently in commerce and/or games created especially for the system.

It is contemplated within the scope of this invention to illuminate the display area, or to use alternate means of illuminating the display or information area, such as back lighting, edge, side, or perimeter lighting, or any combination of them.

An enhanced point of sale system schematic configuration can be found in FIG. 2, wherein there is shown one arrangement, for example of a more complex point of sale system of this invention.

Thus, with reference to FIG. 2, there is shown a power supply A, associated with a voltage regulator B, which supplies and controls power to the microcontroller C, and other components of the system, for example, the interactive game H. As indicated supra, the power can be AC, DC, or Solar in source. For example, the DC source can be the battery of the vehicle that the point of sale system is mounted on. The direct connection would be, for example, through the cigarette lighter receptacle or other accessory power sockets of the vehicle.

In addition, there is shown the microcontroller C, into which the various components feed, in order to control the entire system. "Microcontroller" for purposes of this invention means micro-controllers, such as, for example, a COP 8, and microprocessors such as the 486 manufactured by Intel, or such microprocessors as part of a larger, more complex computer system. Such microcontrollers are commercially available, and can be purchased from Motorola, NEC, or Texas Instruments. Associated with the microcontroller C, are the various components of a sub-system, D, for electronic time stamping, which are, for example, an EEPROM/RAM, a clock, telephone input and/or output ports, Serial multi-pin input and/or output ports, and Parallel multi-pin input and/or output ports.

There is also shown a specific data input/output sub-system comprised of E, an antenna, and F, a receiver, transmitter, or transceiver, which receiver, transmitter, or transceiver is connected into,the microcontroller C. This specific data input system can be either internally mounted in the equipment of the system, or can be mounted externally of the system.

There is further illustrated a triggering sub-system G, for the point of sale system. The triggering sub-system G can be, for example, a keypad, keyboard, video touch screens, or a simple push button. Such key pads and keyboards are well-known to those skilled in the art and can be for example, a seventeen key keypad, or a QWERTY full keyboard.

Finally, there is shown a variety of the activatable systems, namely, an interactive game H associated with the graphic text display J, which can be for example a liquid crystal display or an eight segment light emitting diode configuration, which is connected to the video/graphic driver I' directly to the microcontroller C, a video display I, such as a (CRT) display (typical television style tube), which is also associated with the video/graphic driver I', a microphone K, which can be connected to the microcontroller C by a sound chip or chips K', which can also include an audio amplifier K" and a speaker K"', a game of chance L, such as a lighted roulette game, interactive survey M, an illumination source N, such as color light emitting diodes or mini strobes, a camera or cameras, or video/closed circuit television or a circuit board with a camera lens O, which is associated with a color driver O'; which is connected directly to the microcontroller C, a coupon dispenser P, which may be for example a thermal printer with spool paper, which is associated with a print driver P' and a printer P". It should be understood by those skilled in the art that these are just a few of the illustrations of a system of this invention and that other more or less complex systems can be combined to produce the point of sale invention disclosed and claimed herein.

Figure 3:
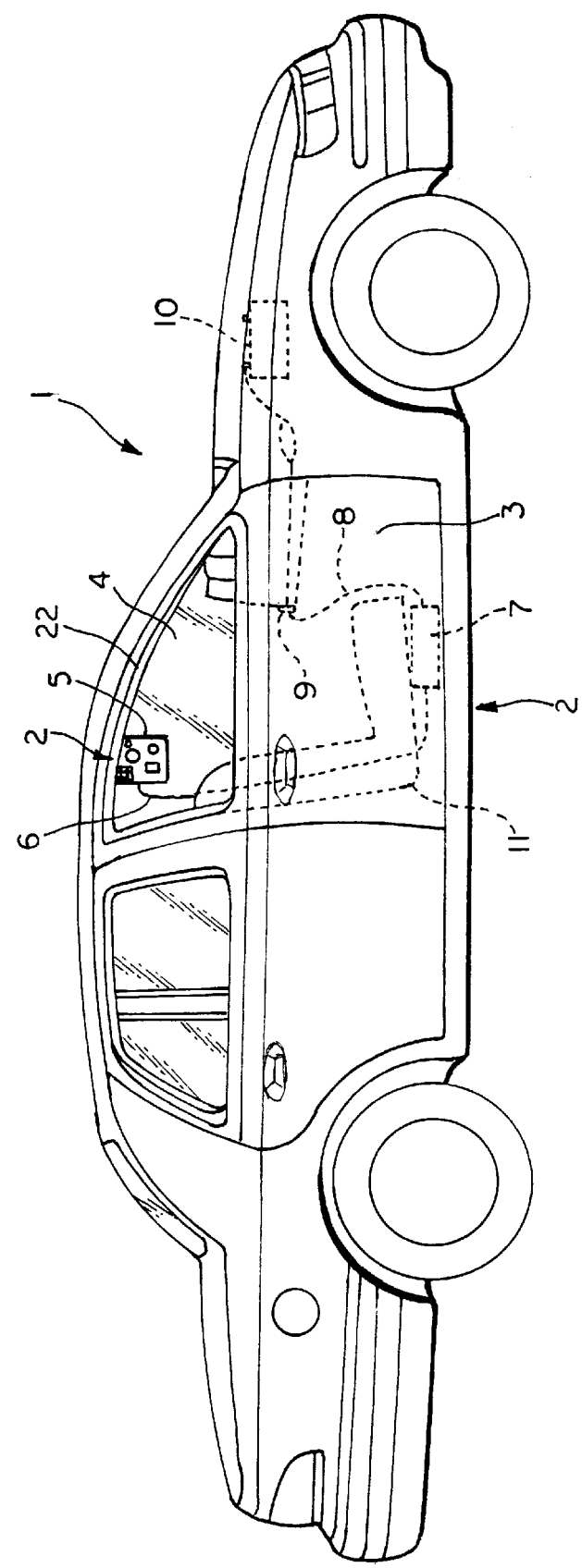
FIG. 3 is an illustration of a vehicle in which the inventive point of sale system has been installed using the two housing configuration.
Figures 4, 5:
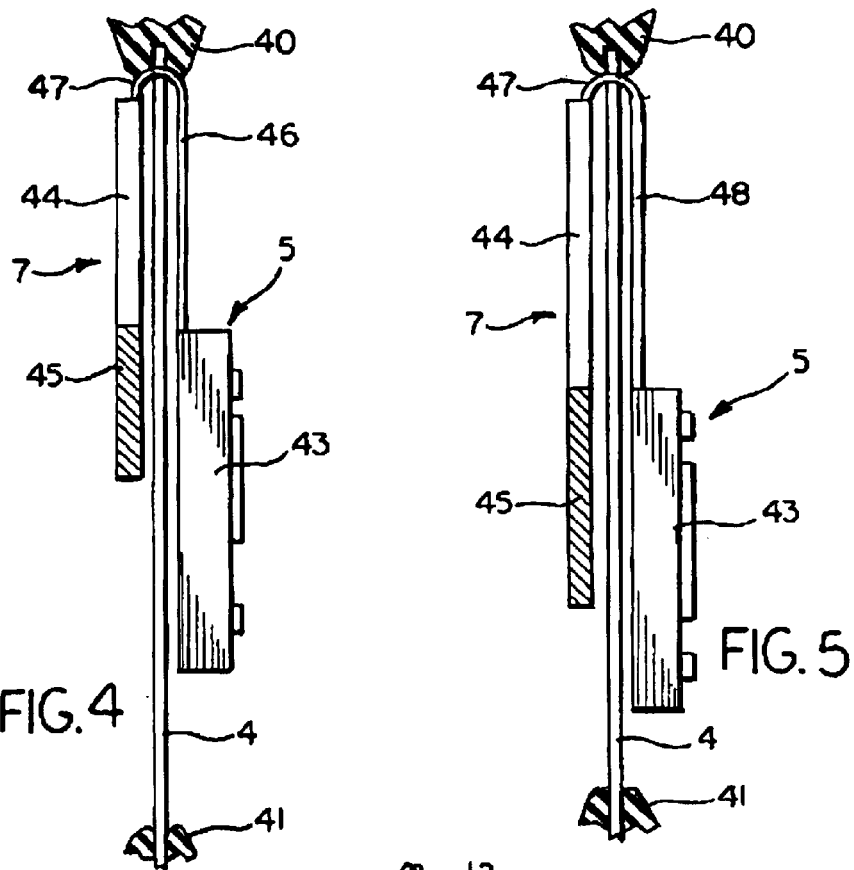
FIG. 4 is an enlarged side view of a window of an automobile door showing the first housing and second housing.
FIG. 5 is a full side view of a window of an automobile door showing the first housing and second housing and a touch screen.

Turning now to FIG. 3, which is an illustration of a vehicle 1 with which the inventive point of sale system 2 can be used. There is shown a vehicle door 3, with a door window 4, to which the first housing 5 of this invention is attached. One means of attachment of the first housing 5 is illustrated in FIG. 4. There is shown in FIG. 3 an electrical connection 6 between the first housing 5 and the second housing 7. Further, there is an electrical connection 8 between the second housing 7 and an electrical source 9, which in this Figure is a cigarette lighter socket within the vehicle 1. The cigarette lighter socket is, in turn, electrically connected by a standard electrical lead to the car battery 10. As shown, one of the convenient places to store the second housing 7 is under the seat 11 of the vehicle 1, however, it should be understood that there are other places within the vehicle 1 that such storage can take place. The electrical connection 6 is shown in phantom behind the car door 3, as is the second housing 7, the electrical connection 8, the electrical source 9, and the car battery 10.

It is contemplated within the scope of this invention to utilize a first housing 5 which is mounted on the exterior of the vehicle 1 and a second housing 7 as is illustrated in FIG. 3, for security purposes.

Turning now to FIG. 4, there is shown an enlarged side view of a window 4 of an automobile door 3 showing the first housing 5 and second housing 7. There is shown a portion 40 of the window frame 22 as shown in FIG. 3 and a portion 41 of the door 3. Shown as part of the first housing 5 is an interactive system 43, which may be essentially similar to that shown in FIGS. 4 and 6. The second housing 7 contains, for example, a video screen 44 with an associated power source 45, such as a battery. In addition, there is a clear screen 46 which forms a part of the holding device 47 for the point of sale system. The holding device 47 not only holds the first housing 5 and the second housing 7 together, but also provides any electrical and data connection means required for the point of sale system in connecting the components of the first housing 5 with the components of the second housing 7. The clear screen 46 provides a clear view of the video screen 44 located behind the window 4.

Turning now to FIG. 5, there is shown a full side view just as in FIG. 4, with the exception that the component 46, the clear screen, is substituted with a touch screen 48. Otherwise, all like components have like numbering.

It is further contemplated within the scope of this invention to utilize only one housing for the containment of the entire point of sale system.

Figure 6:
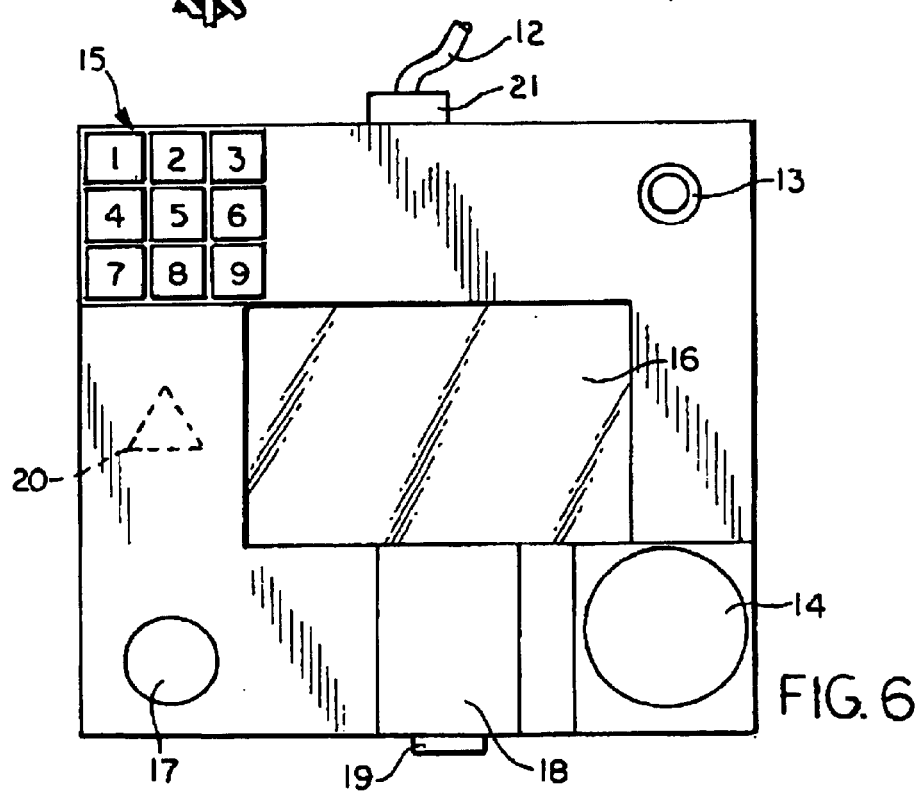
FIG. 6 is a full front view of a housing containing a portion of a point of sale system of this invention.

The first housing 5 can have as one of its configurations, the format set forth in FIG. 6. There is thus shown in FIG. 6, an exterior and interior housing wire lead connector 12 that connects the first housing elements to the second housing 7. There is further shown an activation switch 13, which is available to the customer for activation of the system.

In addition, there is shown a speaker 14, a numeric key pad 15, an electronic display area for video or game use 16, a microphone 17, a printer or coupon delivery system 18, a printer or coupon ejection port 19 for delivery of the coupons, a receiver, transmitter, or transceiver 20 shown in phantom, and a coupler 21 for the exterior and interior housing wire lead connector 12. It is preferred for this invention that this coupler 21 be of the quick disconnect type.

Figure 8:
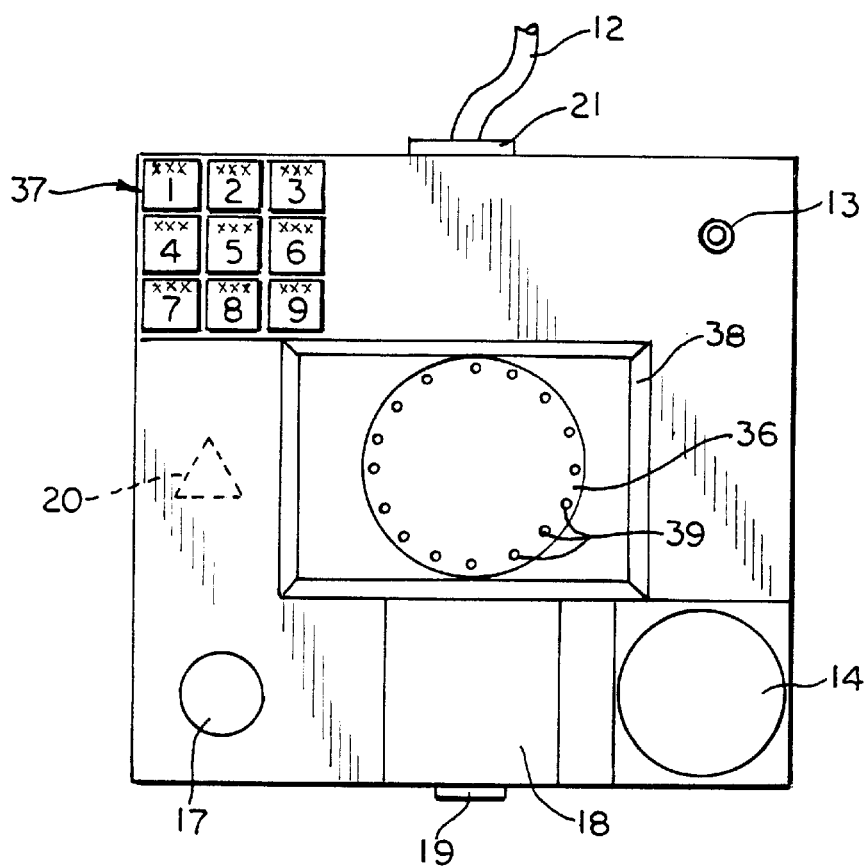
FIG. 8 is a full front view of another configuration of a portion of a point of sale system of this invention.

A further illustration of a point of sales system which includes an electronic roulette game 36 is shown in FIG. 8.

There is shown an the exterior and interior housing wire lead connector 12, a quick disconnect coupler for exterior and interior housing wire lead connector 21, an activation switch 13, an alpha numeric key pad 37, a receiver, transmitter, or transceiver 20, shown in phantom, a microphone 17, a printer or coupon delivery system 18, a printer or coupon ejection port 19, a speaker, and the game 36.

The top of the roulette game 36 is shown in the center of the Figure, and also shown are a clear cover or shield 38, and the lights 39 of the roulette game 36. As a practical matter, the roulette game 36 is powered by a battery (not shown) through an electrical lead (not shown) and controlled by a circuit board (not shown) for the lights 39.

By way of example therefore, the roulette game 36 utilizes electronic lights 39 to simulate a ball on a roulette game. The individual lights are electronically controlled such that when stimulated electrically, each light is illuminated momentarily in quick sequence and in so doing simulate the ball's position and final stationary position on the roulette game 36 surface. In addition, a dice game can be simulated in the same manner by providing a light configuration in which there are only six lights, and the electronics of the game controls certain lights at random and fixes them such that they emulate the dots on the face of a die. That is, if two lights remain lighted, then the die shows a two, if six lights remain lighted at the end of the game, then the die shows six. In this manner, a programmer can select certain numbers that will be associated with a prize or prizes, or merchandise specials that are reduced in price for the game. The exact electronic configurations are not complex, and can be found in many marketed entertainment or recreational products.

Figure 7:
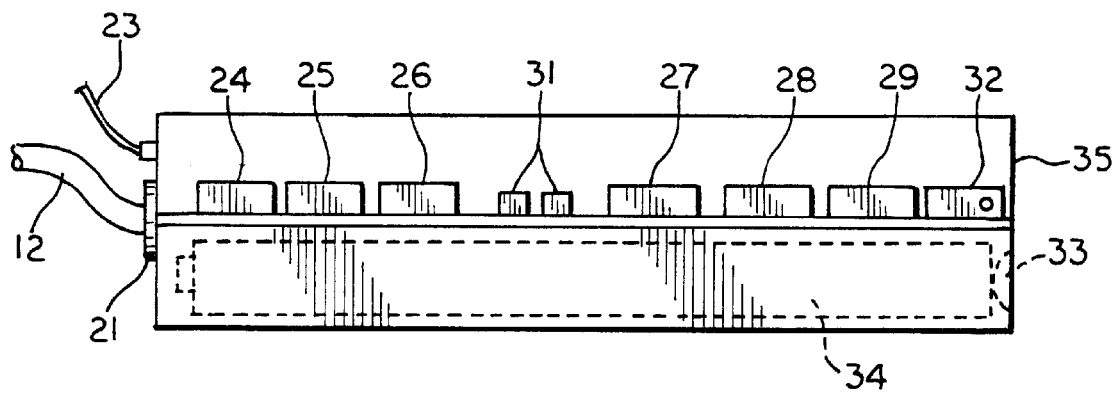
FIG. 7 is a side view of another configuration of a portion of a point of sale system of this invention.

Another configuration for the point of sale systems can be found in FIG. 7 in which there is shown a side view of a first housing 5 in which there is illustrated: an exterior and interior housing wire lead connector 12, a quick disconnect coupler for exterior and interior housing wire lead connector 21, a power lead for AC, DC, or solar electrical source 23, an audio recorder and playback system 24, a video recording and playback system 25, a game system operation 26, a numeric keypad data storage unit 27, a graphics display system 28, a printer and coupon control system 29, a receiver, transmitter, or a transceiver 31, a playback speaker audio volume control 32, an access panel 33 for the battery 34, the battery being shown in phantom. There is finally shown a cap 35 which covers the components.

What is claimed is:

1. An interactive information system for mounting to a vehicle door having a door window, comprising:
   a first housing;
   a second housing;
   a holding device connected to at least said first housing and extending upwardly away from said first housing to an upper end, said holding device being adapted at its upper end to mount to a door of a vehicle such that said first housing is located exteriorly of the vehicle; and
   an electronic system that includes at least one input device, at least one output device, and an activatable system, wherein said first and second housings each contain different portions of said electronic system with said input device being located at said first housing;

said second housing being positionable within the vehicle while said first housing is mounted by said holding device on the vehicle door such that said input device faces away from the door with said output device being positioned so that a person exterior of the vehicle can interact with said input device at the exterior of the vehicle while receiving information from said output device.

2. An interactive information system as defined in claim 1, wherein said first and second housings are connected to each other by said holding device such that they are located on opposite sides of the vehicle window when said holding device is mounted on the window.

3. An interactive information system as defined in claim 1, wherein said second housing is connected to said first housing only by an electrical connection.

4. An interactive information system as defined in claim 2, wherein said first housing includes said activatable system.

5. An interactive information system as defined in claim 2, wherein said second housing includes a display device.

6. An interactive information system as defined in claim 2, wherein said second housing includes a power source.

7. An interactive information system as defined in claim 1, wherein said electronic system includes a power source.

8. An interactive information system as defined in claim 1, wherein said input device comprises an activation source carried by the first housing to enable a person to activate the activatable system from the exterior of the vehicle.

9. An interactive information system as defined in claim 1 wherein the output device is mounted to the first housing.

10. An interactive information system as defined in claim 9 wherein the input device comprises a portion of said activatable system.

11. An interactive information system as defined in claim 1 wherein the activatable system includes an electronic display screen.

12. An interactive information system as defined in claim 11 wherein the electronic display screen displays information.

13. An interactive information system as defined in claim 11 wherein the electronic display screen displays an interactive game.

14. An interactive information system as defined in claim 1 wherein the activatable system includes a microphone.

15. An interactive information system as defined in claim 1 wherein the activatable system includes a camera.

16. An interactive information system as defined in claim 1 wherein the activatable system includes an information area.

17. An interactive information system as defined in claim 1 wherein the activatable system includes an illuminated display.

18. An interactive information system as defined in claim 1 wherein the activatable system includes equipment for vending coupons.

19. An interactive information system as defined in claim 18 which includes equipment for printing coupons prior to vending.

20. An interactive information system as defined in claim 18 wherein the coupons are pre-printed before placing in the activatable system.

21. An interactive information system as defined in claim 1 wherein the activatable system includes an audio recording and playback system.

22. An interactive information system as defined in claim 1 wherein the activatable system includes a video recording and playback system.

23. An interactive information system as defined in claim 1 wherein the activatable system includes a video display system.

24. An interactive information system as defined in claim 1 wherein the activatable system includes a survey system.

25. An interactive information system as defined in claim 1 wherein the activatable system includes an interactive game.

26. An interactive information system as defined in claim 1 wherein the input and output devices include an antenna and a device selected from a group consisting of:
   (i) a receiver,
   (ii) a transmitter, and
   (iii) a transceiver.

27. An interactive information system as defined in claim 1 wherein the electronic system includes equipment for wireless radio communication.

28. An interactive information system as defined in claim 1 wherein the electronic system includes a microcontroller.

29. An interactive information system for mounting to a vehicle door having a door window, comprising:
   a first housings;
   a second housing;
   a holding device connected to said first housing and extending upwardly away from said first housing to an upper end, said holding device being adapted at its upper end to mount to a door of a vehicle such that said first housing is located exteriorly of the vehicle; and
   an electronic system that includes at least one input device, at least one output device, and an activatable system, wherein at least a portion of said electronic system is contained within said first housing;
   wherein said first and second housings each contain different portions of said electronic system with said second housing being positionable within the vehicle such that separate portions of said electronic system are located internally and externally of the vehicle; and
   wherein said first and second housings are connected by said holding device.

30. An interactive information system as defined in claim 29, wherein said holding device is adapted to mount to the vehicle door by fitting over an upper edge of a window of the door such that said first ad second housings are located on opposite sides of the window.

31. An interactive information system as defined in claim 30, wherein said second housing includes a video screen and wherein the interactive information system further comprises a clear screen located between said first housing and said holding device with said screen being positioned in front of said video screen to permit viewing of said video screen though said clear screen.

32. An interactive information system as defined in claim 31, wherein said clear screen comprises a touch screen that forms a part of said electronic system.

* * * * *